3,684,709
COMPLETION FLUID
Smith Alpha, Berwick, La., assignor to Silver Lining, Inc., Morgan City, La.
No Drawing. Continuation of abandoned application Ser. No. 748,939, July 31, 1968. This application Mar. 12, 1971, Ser. No. 123,808
Int. Cl. C09k 3/00; E21b 43/00
U.S. Cl. 252—8.55 R       5 Claims

ABSTRACT OF THE DISCLOSURE

A completion slurry for oil wells consisting essentially of an aqueous dispersion of finely ground oyster shell of a particle size not exceeding 10 microns and finely ground barite of a particle size not exceeding 10 microns.

---

This application is a continuation of application Ser. No. 748,939, filed July 31, 1968, now abandoned.

This invention relates to a completion fluid or slurry for use in an oil well.

Many different kinds of muds and fluids have been used in the drilling and completing of oil wells. Ordinary drilling muds are not satisfactory for use as completion fluids because they contain weighting ingredients which settle into a hard solid cake, fail to form high density soft cakes, contain polluting petroleum bases and are incapable of withstanding high temperature or the presence of sea water.

Conventional completion fluids generally contain polluting oil or organic compound bases in which are suspended various weighting materials and an agent for suspending or reducing settling of the weighting materials, such as bentonite, a gel forming agent.

When barite is present in a completion fluid, a relatively large amount of bentonite, for example, 5% by weight or higher, is required to reduce settling of the barite. However, there is still appreciable settling of the weighting materials in completion fluids or slurries even with such large proportions of bentonite. Such completion fluids preclude or at least greatly hamper pulling the packer.

The invention provides a novel completion slurry which is non-polluting and has all the desirable qualities of a completion fluid, namely, the slurry is stable with little or no tendency toward settling, it forms a high density, soft cake, it is capable of withstanding high temperature and the components can be mixed in sea water in locations where fresh water is not available.

The completion slurry is a stable aqueous dispersion consisting essentially of finely ground oyster shell of 10 micron particle size or smaller and finely ground barite of 10 micron particle size or smaller in a density range of between 11.5 lbs. per gallon and 15 lbs. per gallon.

The preferred completion slurry of the present invention is composed of approximately equal parts by weight of ground oyster shell and ground barite, both of 10 micron particle size or smaller, dispersed in water in concentrations between 11.5 and 15 pounds per gallon. It has been found that little or no settling occurs when the barite and oyster shell are used in approximately equal amounts by weight within the prescribed density range. The ratio of barite to oyster shell can be increased up to 3:1 and retain the characteristics essential to a completion fluid, but the oyster shell content should not exceed the barite content by more than 1.0% by weight.

When bentonite is mixed into the preferred completion slurry, there is an increased tendency towards settling of the barite into smaller and larger particles as well as a tendency for the bentonite itself to separate into layers. The presence of bentonite causes the density of the cake to decrease.

Completion fluids were prepared in densities within the range from 11.5 to 15 lbs. per gallon using Laminar and Laminex brands of oyster shell and Milwhite brand of barite and the test results are as follows:

| Ex. | Composition (g.) | Separation of components | Cake consistency | Depth of cake (cm.) | Cake volume (cc.) | Cake density (g./cc.) |
|---|---|---|---|---|---|---|
| 1 | 20, barite<br>20, laminar | None | Soft cake | 3.2 | 130.56 | .34 |
| 2 | 21, barite<br>21, laminar<br>3, bentonite | do | do | 2.5 | 102.00 | .44 |
| 3 | 22, barite<br>22, laminar<br>1, bentonite | do | do | 1.7 | 69.36 | .64 |
| 4 | 22½, barite<br>22½, laminar | do | do | 1.4 | 57.12 | .78 |
| 5 | 22½, barite<br>22½, laminex | do | do | | | .78 |

NOTE.—Examples 1 through 4 were tested after 2½ months and 5 after 1½ months.

Completion slurries containing equal quantities by weight of ground oyster shell and barite, both of a particle size of 10 microns or less in aqueous dispersions of salt water containing 0.4% NaCl and in densities within the range of from 11.5 to 15 lbs. per gallon, have been heated to temperatures of 250° F. (121° C.) and were found to produce satisfactory soft cakes of high density with no or minimal settling indicating that salt water can be used in lieu of fresh water and that the completion slurries can be subjected to heat.

The completion slurry of the present invention has been described in preferred form and obviously modifications and variations therein are possible. The completion slurry of the present invention should not be limited to any precise composition except insofar as expressly limited in the appended claims.

I claim:

1. A completion slurry for oil wells consisting essentially of an aqueous dispersion of particles of ground oyster shell and ground barite, essentially all of the particles having a size of not greater than about 10 microns, the ratio of barite particles to ground oyster shell particles being in the range of from about 1:1 to about 3:1 and the density of the aqueous dispersion being in the range of from about 11.5 lbs. to about 15 lbs per gallon.

2. A completion slurry as set forth in claim 1 in which the aqueous dispersion contains fresh water.

3. A completion slurry as set forth in claim 1 in which the aqueous dispersion contains salt water.

4. A completion slurry as set forth in claim 1 in which the completion slurry is composed of approximately equal parts by weight of ground oyster shell and barite.

5. A completion slurry as set forth in claim 1 in which the ratio of barite to oyster shell does not exceed 3:1 and in which the oyster shell does not exceed the barite by more than 1.0% by weight.

References Cited

UNITED STATES PATENTS

| | | | |
|---|---|---|---|
| 2,805,722 | 9/1957 | Morgan et al. | 252—8.55 X |
| 2,898,294 | 8/1959 | Priest et al. | 252—8.55 |
| 2,967,150 | 1/1961 | Prokop et al. | 252—8.5 |
| 3,046,222 | 7/1962 | Phansalkar et al. | 252—8.55 |
| 3,126,950 | 3/1964 | Carlberg et al. | 252—8.55 |

HERBERT B. GUYNN, Primary Examiner